United States Patent
Farnsworth et al.

(10) Patent No.: US 7,343,251 B1
(45) Date of Patent: Mar. 11, 2008

(54) METHOD TO DETECT A HYDROGEN LEAK IN A FUEL CELL

(75) Inventors: Jared M. Farnsworth, Holyoke, CO (US); Justin David Ward, Aliso Viejo, CA (US); Bradley Landon Spare, Oceanside, CA (US)

(73) Assignee: Toyota Motor Engineering & Manufacturing North America, Inc., Ann Arbor, MI (US)

( * ) Notice: Subject to any disclaimer, the term of this patent is extended or adjusted under 35 U.S.C. 154(b) by 0 days.

(21) Appl. No.: 11/669,492

(22) Filed: Jan. 31, 2007

(51) Int. Cl.
*G01F 17/00* (2006.01)
*G01F 23/00* (2006.01)

(52) U.S. Cl. .................. 702/51; 73/40.5 R; 429/12; 429/25

(58) Field of Classification Search .............. 702/51, 702/24; 73/40, 40.5 R, 40.5 A, 49.1, 1.06, 73/31.06; 429/121, 131, 25; 422/58
See application file for complete search history.

(56) References Cited

U.S. PATENT DOCUMENTS

| | | | |
|---|---|---|---|
| 4,300,066 A | 11/1981 | Butler, III | |
| 4,766,557 A | 8/1988 | Twerdochlib | |
| 5,678,410 A | 10/1997 | Fujita et al. | |
| 5,763,113 A * | 6/1998 | Meltser et al. | 429/13 |
| 5,925,817 A | 7/1999 | Kidokoro et al. | |
| 5,964,089 A | 10/1999 | Murphy et al. | |
| 6,176,118 B1 | 1/2001 | Kidokoro et al. | |
| 6,851,298 B2 * | 2/2005 | Miura et al. | 73/40.5 R |
| 6,978,665 B2 | 12/2005 | Aoyagi et al. | |
| 2003/0077495 A1 * | 4/2003 | Scartozzi et al. | 429/25 |
| 2003/0082417 A1 * | 5/2003 | Lillis | 429/12 |
| 2004/0216514 A1 | 11/2004 | Nunnally et al. | |
| 2005/0171677 A1 | 8/2005 | Gottwick et al. | |
| 2005/0181244 A1 | 8/2005 | Porter et al. | |
| 2006/0114114 A1 * | 6/2006 | Nakano et al. | 340/632 |

FOREIGN PATENT DOCUMENTS

| | | |
|---|---|---|
| JP | 11224681 | 8/1999 |
| JP | 2001-345113 | 12/2001 |

* cited by examiner

*Primary Examiner*—John Barlow
*Assistant Examiner*—John Le
(74) *Attorney, Agent, or Firm*—Gifford, Krass, Sprinkle, Anderson & Citkowski, P.C.

(57) ABSTRACT

In one aspect, there is disclosed a method of detecting a hydrogen leak in a fuel cell system, including the steps of (a) calculating a mass of hydrogen in a fuel tank, HT new, at a time step, (b) calculating a mass of the hydrogen consumed by the fuel cell at the time step, HFcp new, (c) calculating a total amount of hydrogen that has left the tank from a start to the time step, HTcons, (d) calculating a total amount of hydrogen consumption, HFcpcons, (e) calculating a difference between HTcons and HFcpcons at the time-step, (f) determining if the difference is above a predetermined threshold, and (g) performing an action based on the determination of step (f).

14 Claims, 1 Drawing Sheet

METHOD TO DETECT A HYDROGEN LEAK IN A FUEL CELL

FIELD OF THE INVENTION

The invention relates to a method of detecting a hydrogen leak in a fuel cell system.

BACKGROUND OF THE INVENTION

Electrochemical fuel cells are generally known in the art and convert fuel and an oxidant to electricity. One such fuel cell is a solid polymer electrochemical cell and includes a membrane electrode assembly "MEA" that includes an ion exchange member or other electrolyte disposed between an anode and cathode. The MEA may include a catalyst or other catalytic material at each interface between the membrane and electrode to induce a desired electrochemical reaction. The electrodes are electrically coupled to provide a circuit for conducting electrons between the electrodes through an external circuit.

In a hydrogen-powered fuel cell, hydrogen and air are supplied to the electrodes on either side of an ion exchange membrane. Hydrogen is typically supplied to the anode where a catalyst promotes a separation into protons and electrons which are conducted through the external circuit. On the opposing side of the membrane, air is provided to the cathode where oxygen in the air reacts with the protons passing through the ion exchange membrane to produce byproduct water.

The fuel source in such hydrogen-powered systems is flammable and should be monitored closely to prevent a dangerous condition. Examples are known in the art of providing hydrogen sensors in a fuel cell to monitor the hydrogen concentration and shut down or otherwise warn an operator of the fuel cell of a dangerous hydrogen concentration.

However, hydrogen sensors utilized to detect the concentration of a hydrogen fuel may not detect hydrogen leaks of varying size, including smaller hydrogen leaks which may not be detected using a traditional sensor. Additionally, when a vehicle having a fuel cell is moving, ambient air may mix and dilute leaking hydrogen making hydrogen detection difficult.

There is therefore a need in the art for an improved method of detecting a hydrogen leak in a fuel cell that allows detection of various size or concentration hydrogen leaks when the car is stationery or moving. There is also a need in the art for an improved method of detecting a hydrogen leak in a fuel cell that does not require the use of hydrogen concentration detectors that may not detect various sized hydrogen leaks and may provide false hydrogen concentration readings.

SUMMARY OF THE INVENTION

In one aspect, there is disclosed a method of detecting a hydrogen leak in a fuel cell system, including the steps of (a) calculating a mass of hydrogen in a fuel tank, HT new, at a time step, (b) calculating a mass of the hydrogen consumed by the fuel cell at the time step, HFcp new, (c) calculating a total amount of hydrogen that has left the tank from a start to the time step, HTcons, (d) calculating a total amount of hydrogen consumption, HFcpcons, (e) calculating a difference between HTcons and HFcpcons at the time-step, (f) determining if the difference is above a predetermined threshold, and (g) performing an action based on the determination of step (f).

DETAILED DESCRIPTION OF THE PREFERRED EMBODIMENTS

Figure 1:
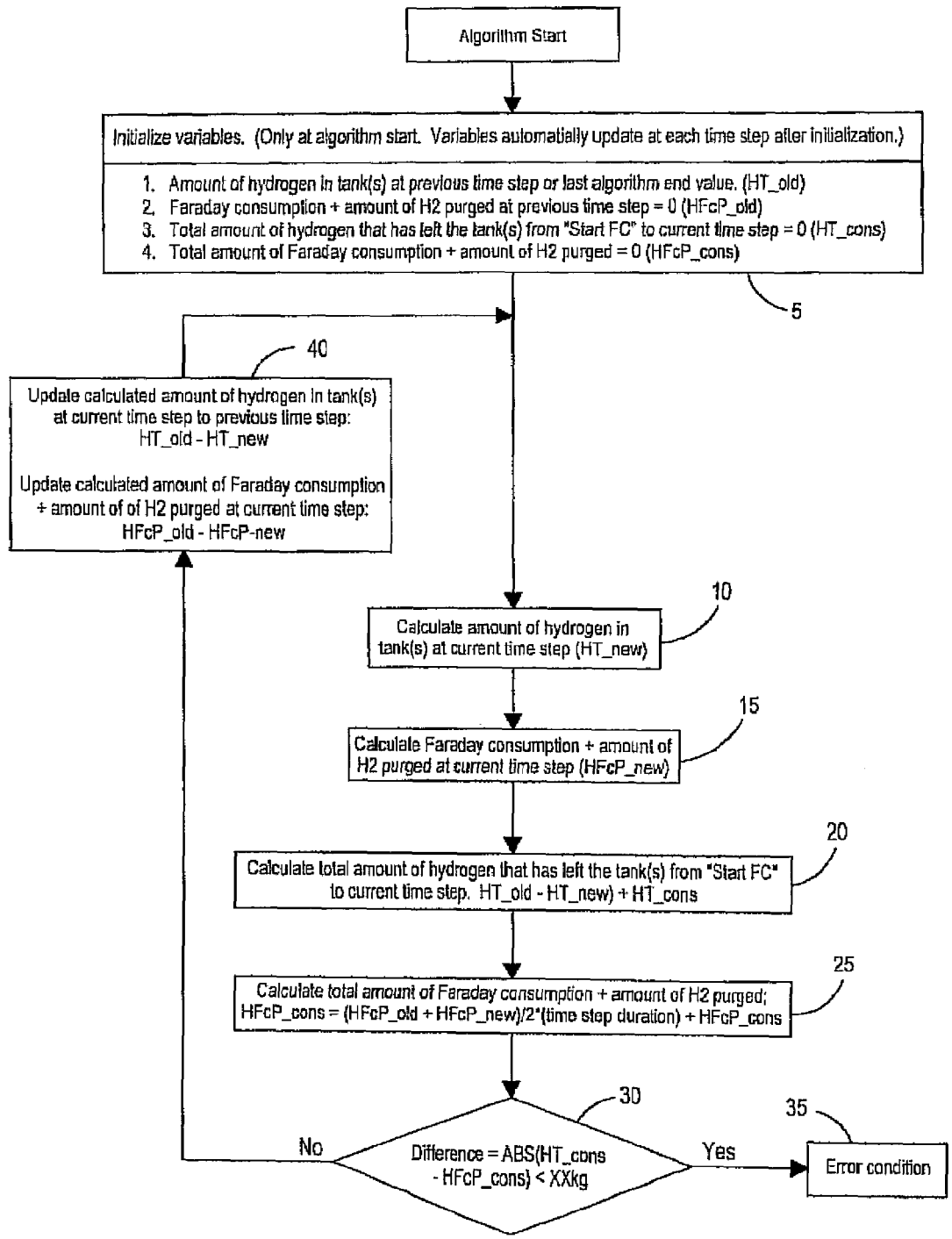
FIG. 1 is a full diagram of the method for detecting a hydrogen leak.

Referring to FIG. 1, there is shown a flow diagram for a method of detecting a hydrogen leak in a fuel cell system. As can be seen in the flow diagram, in a first step 5, the variables associated with the method of detecting a hydrogen leak are initialized and set to an initial zero value. This initialization step is needed only when the method is initially started as values within the method are reset to corresponding previous values for variables used in the method, as will be discussed in more detail below.

Following the initialization step 5, the following step 10 includes calculating a mass, of hydrogen in a fuel tank at a corresponding time step, HT new. The mass, HT new, is calculated according to the formula: HT new=(Ptank*Vtank/(z*R*Ttank))*0.00202 wherein Ptank is a tank pressure, Vtank is a tank volume, Ttank is a tank temperature, z is a compressibility factor, and R is a gas constant. It should be realized that various time increments or steps may be utilized by the method.

Following the step 10 of calculating the mass UT new, in the next step 15 another mass of the hydrogen consumed by the fuel cell at the time-step is calculated, HFcp new. The mass, HFcp new is equal to the sum of a Faraday consumption and an amount of hydrogen purged at the time-step. The Faraday consumption is calculated according to the formula: The Faraday consumption=(FC current*400)/(2*96485))*0.00202, wherein FC current is the current produced by the fuel cell. The amount of hydrogen purged may be calculated according to the formula: Mpurge=No. of purges*Msingle purge wherein Msingle purge is the mass of fuel exhausted in a single purge. In one aspect, Msingle purge may be assigned a predetermined value.

Following the step 15 of calculating the mass HFcp new, in the next step 20 a total amount of hydrogen is calculated that has left the tank from a start to the time-step, HTcons. HTcons may be calculated according to the formula: HTcons=(HTold−HTnew)+HTcons old, wherein HTold is a mass of hydrogen in the fuel tank at a previous time step and HTcons old is the total amount of hydrogen that has left the tank from the previous time step.

In a next step 25, a total amount of hydrogen consumption, HFcpcons is calculated. The total amount of hydrogen consumption HFcpcons may be calculated according to the formula: HFcpcons=(HFcp old+HFcp new)/2*(time duration step)+HFcpcons old, wherein HFcp old equals the sum of a Faraday consumption and an amount of hydrogen purged at a previous time-step, the time duration step equals a numerical count of the number of time-steps, and HFcpcons old equals the total amount of hydrogen consumption at the previous time-step.

In a next step 30 of the method, a difference between HTcons and HFcpcons is calculated at the time-step.

Following the calculation of the difference, it is next determined if the difference is above a predetermined threshold in step 35. An action may then be performed in step 40 based on the determination in the previous step 35. Various actions may be performed if the difference exceeds the threshold, including generating an error signal indicating a hydrogen leak, shutting down the fuel cell system, or otherwise indicating a hydrogen leak is occurring. Additionally, if the difference is determined to be below a predetermined threshold, the previous steps are repeated in a loop.

When repeating the previously outlined steps, the mass of hydrogen previously calculated in step 10 is set as HTold, representing the mass of hydrogen in a fuel tank at the previous time-step. Additionally, the mass of hydrogen previously calculated in step 15 is set as HFcp old, representing the mass of hydrogen consumed by the fuel cell at the previous time-step. In this manner, the mass of the hydrogen is updated as the method proceeds through an increasing number of time-steps.

As can be seen from the preceding description, the method does not include the use of a hydrogen concentration sensor that detects a concentration of hydrogen. Additionally, the method includes calculating a mass, as opposed to a mass flow rate, improving a performance of the method over a flow rate method. Additionally, the method as outlined above, includes calculating a difference between the total amount of hydrogen consumption and the total amount of hydrogen that has left the tank and then comparing it to a predetermined threshold. This step provides an additional level of leak detection robustness as compared to prior art designs as it provides a threshold value which may be scaled or otherwise adjusted, and does not compare just an actual consumption vs. a theoretical or modeled consumption. The threshold value may be determined based on an expected measurement error at normal system dynamics preventing false/positive error reports.

The invention has been described in an illustrative manner. It is to be understood that the terminology which has been used is intended to be in the nature of words of description, rather than limitation. Many modifications and variations of the invention are possible in light of the above teachings. Therefore, within the scope of the appended claims, the invention may be practiced other than as specifically described.

The invention claimed is:

1. A method of detecting a hydrogen leak in a hydrogen fuel cell system comprising the steps of:
   a) calculating a mass, HTnew of hydrogen in a fuel tank at a time step;
   b) calculating a mass, HFcpnew of the hydrogen consumed by the fuel cell at the time step;
   c) calculating a total amount of hydrogen that has left the tank from a start to the time step, HTcons;
   d) calculating a total amount of hydrogen consumption, HFcpcons;
   e) calculating a difference between HTcons and HFcpcons at the time step;
   f) determining if the difference is above a predetermined threshold;
   g) performing an action based on the determination of step f) wherein the action includes generating an error signal indicating a hydrogen leak, shutting down the fuel cell system, or indicating a hydrogen leak is occurring when the difference is above the predetermined threshold and repeating steps a) through f) when the difference is below the predetermined threshold.

2. The method of claim 1 wherein HTnew is calculated according to the formula:
   HTnew=(Ptank*Vtank((z*R*Ttank))*0.00202 wherein Ptank is a tank pressure, Vtank is a tank volume, Ttank is a tank temperature, z is a compressibility factor, and R is a gas constant.

3. The method of claim 1 wherein HFcpnew equals the sum of a faraday consumption and an amount of hydrogen purged at the time step.

4. The method of claim 3 wherein the faraday consumption is calculated according to the formula:
   Faraday consumption=((FC current*400)/(2*96485))*0.00202 wherein FC current is the current produced by the fuel cell.

5. The method of claim 3 wherein the amount of hydrogen purged is calculated according to the formula:
   Mpurge=number of purges*Msingle purge wherein M single purge is the mass of fuel exhausted in a single purge.

6. The method of claim 5 wherein Msingle purge is assigned a predetermined value.

7. The method of claim 1 wherein HTcons is calculated according to the formula:

$HTcons=(HTold-HTnew)+HTcons\ old$ wherein HTold is the mass of hydrogen in the fuel tank at a previous time step and HT cons old is the total amount of hydrogen that has left the tank from the previous time step.

8. The method of claim 1 wherein HFcpcons is calculated according to the formula:
   HFcpcons=(HFcp old+HFcp new)/2*(time duration step)+HFcp cons old wherein Hfcp old equals the sum of a faraday consumption and an amount of hydrogen purged at a previous time step, time duration step equals a numerical count of the number of time steps, and HFcp cons old equals the total amount of hydrogen consumption at the previous time step.

9. The method of claim 1 wherein in the determination step f) the difference exceeds the predetermined threshold and the action of step g) includes shutting down the hydrogen fuel cell system.

10. The method of claim 1 wherein in the determination step f) the difference does not exceed the predetermined amount and the action of step g) includes repeating steps a) through g).

11. The method of claim 10 wherein the mass of hydrogen previously calculated in step a) is set as HTold representing the mass of hydrogen in a fuel tank at the previous time step.

12. The method of claim 10 wherein the mass of hydrogen previously calculated in step b) is set as HFcp old representing the mass of hydrogen consumed by the fuel cell at the previous time step.

13. The method of claim 1 including the step of initializing mass variables at a start up of the fuel cell.

14. A method of detecting a hydrogen leak in a hydrogen fuel cell system comprising the steps of:
   a) calculating a mass, HTnew of hydrogen in a fuel tank at a time step according to the formula:
   HTnew=(Ptank*Vtank/(z*R*Ttank))*0.00202 wherein Ptank is a tank pressure, Vtank is a tank volume, Ttank is a tank temperature, z is a compressibility factor, and R is a gas constant;
   b) calculating a mass, HFcpnew of the hydrogen consumed by the fuel cell at the time step as the sum of a faraday consumption and an amount of hydrogen purged at the time step according to the formula: Faraday consumption=((FC current*400)/(2*96485))*0.00202 wherein FC current is the current produced by the fuel cell and Mpurge=number of purges*Msingle purge wherein M single purge is the mass of fuel exhausted in a single purge;

c) calculating a total amount of hydrogen that has left the tank from a start to the time step, HTcons;

d) calculating a total amount of hydrogen consumption, HFcpcons;

e) calculating a difference between HTcons and HFcpcons at the time step;

f) determining if the difference is above a predetermined threshold;

g) performing an action based on the determination of step f) wherein the action includes generating an error signal indicating a hydrogen leak, shutting down the fuel cell system, or indicating a hydrogen leak is occurring when the difference is above the predetermined threshold and repeating steps a) through f) when the difference is below the predetermined threshold.

* * * * *